(12) United States Patent
Shi

(10) Patent No.: US 9,973,324 B2
(45) Date of Patent: May 15, 2018

(54) TRANSMISSION METHOD AND APPARATUS IN TDD-FDD JOINT SYSTEM

(71) Applicant: Shanghai Langbo Communication Technology Company Limited, Shanghai (CN)

(72) Inventor: Fei Shi, Shanghai (CN)

(73) Assignee: Shanghai Langbo Communication Technology Company Limited, Shanghai (CN)

( * ) Notice: Subject to any disclaimer, the term of this patent is extended or adjusted under 35 U.S.C. 154(b) by 169 days.

(21) Appl. No.: 14/915,191

(22) PCT Filed: Aug. 5, 2014

(86) PCT No.: PCT/CN2014/083677
§ 371 (c)(1),
(2) Date: Feb. 26, 2016

(87) PCT Pub. No.: WO2015/027798
PCT Pub. Date: Mar. 5, 2015

(65) Prior Publication Data
US 2016/0204926 A1  Jul. 14, 2016

(30) Foreign Application Priority Data

Aug. 26, 2013 (CN) .......................... 2013 1 0375912

(51) Int. Cl.
*H04L 5/14* (2006.01)
*H04L 5/00* (2006.01)
(Continued)

(52) U.S. Cl.
CPC .............. *H04L 5/14* (2013.01); *H04L 1/1854* (2013.01); *H04L 5/001* (2013.01); *H04L 5/0055* (2013.01);
(Continued)

(58) Field of Classification Search
None
See application file for complete search history.

(56) References Cited

U.S. PATENT DOCUMENTS

| 2012/0257552 A1 | 10/2012 | Chen et al. |
| 2014/0161002 A1* | 6/2014 | Gauvreau ............ H04W 16/24 370/280 |

(Continued)

FOREIGN PATENT DOCUMENTS

| CN | 102223219 A | 10/2011 |
| CN | 103138885 A | 6/2013 |
| CN | 103944701 A | 7/2014 |

OTHER PUBLICATIONS

International Search Report dated Nov. 3, 2014 from International Patent Application No. PCT/CN2014/083677 filed Aug. 5, 2014.

*Primary Examiner* — Mohammad S Adhami
(74) *Attorney, Agent, or Firm* — Sunstone IP

(57) ABSTRACT

The present invention provides a transmission method and apparatus in a TDD-FDD joint system. In an embodiment of cross-carrier scheduling, an HARQ time sequence of a PUSCH on a scheduled CC complies with a time sequence of a TDD system, and an HARQ time sequence of a PDSCH on the scheduled CC complies with a time sequence of an FDD system; if an uplink reference frame structure on the scheduled CC is #0, uplink-scheduling DCI of the scheduled CC comprises ULI/DAI bits; and if the uplink reference frame structure on the scheduled CC is one of #1 to #6, the uplink-scheduling DCI of the scheduled CC does not comprise the ULI/DAI bits. By using the technical solutions provided in the present invention, redundant overheads of the DCI are reduced, the coverage of the DCI is enlarged, and meanwhile, the compatibility with an existing system is kept to the greatest degree in the present invention.

12 Claims, 2 Drawing Sheets

(51) Int. Cl.
*H04W 72/04* (2009.01)
*H04L 1/18* (2006.01)
*H04W 72/12* (2009.01)

(52) U.S. Cl.
CPC ......... *H04L 5/0094* (2013.01); *H04W 72/042* (2013.01); *H04W 72/1268* (2013.01)

(56) References Cited

U.S. PATENT DOCUMENTS

| | | | | |
|---|---|---|---|---|
| 2014/0293893 A1* | 10/2014 | Papasakellariou | .... | H04W 72/04 370/329 |
| 2015/0043394 A1* | 2/2015 | Lin | ....... | H04L 1/1861 370/280 |
| 2015/0188687 A1* | 7/2015 | Gao | ....... | H04L 1/1607 370/278 |
| 2016/0044638 A1* | 2/2016 | Gao | .......... | H04W 72/042 370/280 |

\* cited by examiner

TRANSMISSION METHOD AND APPARATUS IN TDD-FDD JOINT SYSTEM

BACKGROUND

Technical Field

The disclosure is related to a subframe scheduling scheme in the Time Division Duplex—Frequency Division Duplex (TDD-FDD) joint system, and more particular to a timing scheme for the cross-carrier scheduling in the TDD-FDD Long Term Evolution (LTE) system, and specifically to a transmission method and device in a TDD-FDD joint system.

Related Art

The traditional LTE (Long Term Evolution) system of 3rd Generation Partner Project (3GPP) defines two duplex modes, which are Frequency Division Duplex (FDD) system and Time Division Duplex (TDD) system respectively. FDD adopts frame structure 1, while TDD adopts frame structure 2. The difference between FDD and TDD lies in that each subframe of FDD frame configuration is 1 millisecond, while the TDD system defines 1 to 2 special subframes in one frame (10 subframes). The special subframes are composed of a downlink synchronous time slot, a guard period and an uplink synchronization time slot. 3GPP defines the frame configuration for the TDD-LTE system, as shown in Table 1, in which D indicates downlink subframe, U indicates uplink subframe, and S indicates special subframe.

TABLE 1

TDD LTE Frame Configuration

| TDD Frame Configuration | Downlink-to-Uplink Switch-point Periodicity | Subframe Index No. | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

3GPP further defines the uplink scheduling delay k for the cross-subframe, as shown in Table 2. The meaning of k is: for Downlink Control Information (DCI) used for uplink scheduling in the downlink subframe n, the scheduling subframe is on the subframe n+k. It should be noted that for TDD frame configuration #0, k is as shown in Table 2, or 7, or as shown in Table 2 and 7 simultaneously, which may be configured via the uplink index (ULI) in DCI.

TABLE 2

Scheduling Parameter k of the uplink subframe in TDD LTE

| TDD Frame Configuration | Subframe Index No. | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | 4 | | |
| 3 | 4 | | | | | | | 4 | 4 | |
| 4 | | | | | | | | | 4 | 4 |
| 5 | | | | | | | | | 4 | |
| 6 | 7 | 7 | | | | 7 | 7 | | | 5 |

When the Physical Uplink Shared Channel (PUSCH) is scheduled according to the frame configuration #0 (for example, the uplink reference DL/UL frame structure in the above scheme is #0), the two-bit uplink index (ULI) is defined in the DCI to indicate the index of the uplink subframe scheduled by the DCI. It should be noted that the two bits are used for Downlink Assignment Index (DAI) instead of being used as ULI for the non-zero frame configurations. That is, the two bits are used to indicate the amount of Physical Downlink Shared Channel (PDSCH) represented by the uplink ACK/NACK corresponding to the DCI. For the ACK/NACK reported on the uplink subframe n, the targeting PDSCH can only be PDSCH indicated by DCI sent on the subframe n−k, wherein k belongs to the subframe set K, as defined in Table 3.

TABLE 3

Downlink Associating Subframe Set K

| TDD Frame Configuration | Subframe Index n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In LTE system, the communication between the base station and the user equipment (UE) is scheduled by Physical Downlink Control Channel (PDCCH). The information transmitted on PDCCH is Downlink Control Information (DCI). Further, DCI is divided into uplink-scheduling DCI and downlink-scheduling DCI. The former schedules the UE to transmit uplink data, and the latter schedules the UE to receive downlink data. As of 3GPP Release 11 (R11), DCI formats {0, 4} are for uplink-scheduling DCI, DCI formats {1, 1A, 1B, 1C, 1D, 2, 2A, 2B, 2C, 2D} are for downlink-scheduling DCI, and DCI formats {3, 3A} are for adjusting uplink transmission power. For the TDD system, DCI includes additional bits (that is the additional bits do not occur in FDD system). For example, Downlink Assignment Index (DAI) or Uplink Index (ULI) of two bits, sounding Reference Signal Request of one bit of partial DCI format (2B, 2C, 2D), or Hybrid Automatic Repeat Request (HARQ) process number of additional one bit. Therefore, under the same system configuration and DCI format, DCI in the TDD system usually has additional two to four bits compared to the DCI in FDD system.

In order to improve the peak rate of communication and provide greater flexibility in scheduling, 3GPP introduces Carrier Aggregation (CA) technology, that is to allow UE to simultaneously receive and send data on more than one carrier. When the UE is configured with more than one carrier, one of the carriers is Primary Carrier Component (PCC), and the others are Secondary Carrier Component (SCC). Further, the cross carrier scheduling technology is introduced to 3GPP, that is DCI has Carrier Indicator Field (CIF) of additionally three bits for indicating which candidate carrier is the carrier scheduled by DCI. The CIF value of PCC is fixed to 0. The system configures that whether the current DCI includes CIF or not thorough the high layer signaling. The UE reads the high layer signaling on PCC to obtain the system information of PCC and SCC. The high layer signaling is Radio Resource Control (RRC) layer signaling.

The traditional CA is performed internally in the same duplex mode, that is multiple TDD carriers are aggregated or multiple FDD carriers are aggregated. 3GPP RAN #60 plenary approved a newstudy item: LTE TDD-FDD Joint Operation, that is a UE may access TDD and FDD network simultaneously to obtain higher communicate rate or better communication experience. One intuitive solution is to expand the tranditional carrier aggregation scheme to TDD-FDD Joint Operation, that is the carrier aggregation scheme is performed between TDD carrier and FDD carrier.

When a FDD carrier is adopted as scheduling CC, and a TDD carrier is adopted as scheduled CC, the timing of the cross carrier scheduling requires special design. The scheduling timing includes uplink scheduling timing and downlink scheduling timing. The uplink scheduling timing includes the timing relationship among the various steps: the base station transmits uplink-scheduling DCI, the UE transmits data on PUSCH according to the DCI, the base station transmits ACK/NACK on Physical HARQ Indicator Channel (PHICH), and the UE transmits data on PUSCH according to the ACK/NACK. The downlink scheduling timing includes the timing relationship of the following steps: the base station transmits the downlink-scheduling DCI and data, and the UE reports uplink ACK/NACK.

SUMMARY

Taking into account the compatibility with the existing systems, one intuitive idea is that when a FDD carrier is adopted as PCC and the TDD carrier is adopted as SCC, the cross carrier downlink scheduling complies with FDD downlink scheduling timing and the cross carrier uplink scheduling complies with TDD uplink scheduling timing. However, through study the inventor discovers that many conflictions exist between the payload size of TDD uplink-scheduling DCI and FDD downlink-scheduling DCI. If it is solved by adding padding bits, there would be more redundant bits. The present invention discloses technical solutions for the above mentioned problem in the LTE TDD-FDD joint system.

According to the transmission method used in UE for a TDD-FDD joint system, the method comprises the following steps:

Step A: receiving a first DCI on the subframe n on a first carrier, wherein the first carrier is a FDD downlink carrier, n is an integer, and the first DCI is the uplink-scheduling DCI; and Step B: transmitting the uplink data on PUSCH of a second carrier in the subframe n+k according to the scheduling of the first DCI, wherein the second carrier is a TDD carrier, k is the uplink scheduling delay of the uplink reference frame configuration of the second carrier on the subframe n;

wherein for frame configuration #{0, 1, 2, 3, 4, 5, 6}, the first DCI comprises the ULI/DAI bits only when the uplink reference frame configuration is configuration #0.

The uplink scheduling delay is an absolute value of the difference between the subframe index of the uplink-scheduling DCI and the subframe index of the corresponding PUSCH transmission. In the FDD-LTE system, the uplink scheduling delay is 4. The FDD carrier is a carrier supporting the LTE system on the FDD band. The TDD carrier is a carrier supporting the LTE system on the TDD band. The uplink-scheduling DCI means DCI format {0, 4}, and the potential DCI formats defined in the future 3GPP releases. The PUSCH scheduling on the second carrier that is performed by the first carrier, the PHICH feedback, and the PUSCH retransmission comply with the timing relationship of the uplink reference frame configuration of the second carrier. The configuration of the uplink reference frame configuration is to be further discussed by 3GPP. The uplink reference frame configuration of the second carrier may be one of the following:

Scheme 1: the frame configuration configured by System Information Block (SIB) of the second carrier;

Scheme 2: the frame configuration configured by the high layer signaling, wherein the high layer signaling includes Radio Resource Control (RRC) layer signaling, Medium Access Control (MAC) layer signaling, etc.; and Scheme 3: static configuration, that is the uplink reference frame configuration of the second carrier is fixed as for example the frame configuration #0.

The above Scheme 2 and Scheme 3 are only applicable for the enhanced Interference Management Traffic Adaptation (eIMTA)-supported second carrier. Scheme 1 is applicable for the non-eIMTA second carrier.

The uplink-scheduling DCI includes two ULI/DAI bits (being as ULI (uplink index) when the frame configuration is #0, and being as DAI (downlink assignment index) when the frame configuration is other configuration), which are TDD unique bits, such that the uplink-scheduling DCI of TDD has additionally two bits comparing with the DCI of FDD having the same format. ULI is used to indicate the uplink subframe scheduled by the uplink-scheduling DCI, and DAI is used to indicate the amount of the downlink PDSCH associated with ACK/NACK transmitted on the scheduled PUSCH.

Preferably, the Step A comprises the following step A1, and the Step B comprises the following Step B1:

Step A1: in the jth subframe before the subframe n+k of the second carrier, receiving at least one of the following:

PDSCH data;

PDCCH indicating SPS (Semi Persistent Scheduling) release;

EPDCCH indicating SPS release;

Step B1: transmitting ACK/NACK associating with the Step A1 on the PUSCH;

wherein j is an uplink scheduling delay of the FDD system, in which j is 4.

The essence of this aspect of the present invention is that for the cross-carrier scheduling that the FDD carrier is a scheduling CC and the TDD carrier is a scheduled CC, downlink scheduling complies with FDD timing. ACK/NACK associating with the PDSCH of at most one subframe can be reported on Uplink PUSCH. Therefore, DAI bits in DCI are not required.

Preferably, the method further comprises the following steps:

Step C: for the uplink data, detecting the PHICH information in the sth subframe after the subframe n+k on the first carrier, wherein s is the PHICH reporting delay corresponding to the uplink reference frame configuration;

Step D: transfering ACK information to higher layers when the PHICH is detected as ACK, or when no PHICH is detected.

The essence of this aspect of the present invention is that for the cross-carrier scheduling that the FDD carrier is a scheduling CC and the TDD carrier is a scheduled CC, uplink scheduling complies with TDD timing.

Preferably, a padding bit of the first DCI is added according to the LTE scheme, wherein the corresponding downlink DCI is counted according to the payload size of the cross-carrier scheduling performed in the FDD system for the second carrier.

When the first DCI is DCI format 0, the first DCI and DCI 1A that is mapped onto the same searching space and used to schedule the second carrier should satisfy the requirement: the first DCI and the DCI 1A have the same bit number, and the bit number is not the value as shown in Table 4.

Table 5 is one embodiment according to the present invention. It is appreciated that when the uplink reference frame configuration of the second carrier is #1~#6, the bit number of DCI 0/1A/1B/1D/4 is less than the corresponding bit number of the uplink reference frame configuration being as #0. The DCI coverage increase correspondingly by the DCI overhead is saved. The bit number of the downlink-scheduling DCI in Table 5 is counted according to the payload size of the cross-carrier scheduling performed in the FDD system. That is it does not include TDD specific bit.

TABLE 5

| | DCI bit number (with CIF, configured with a plurality of carriers) | | | | | |
|---|---|---|---|---|---|---|
| | 1.4 MHz | 3 MHz | 5 MHz | 10 MHz | 15 MHz | 20 MHz |
| Format 0/1A (Frame Configuration #1~#6) | 25 | 27 | 29 | 31 | 33 | 33 |
| Format 1B (Frame Configuration #1~#6) | 27 | 29 | 31 | 33 | 34 | 35 |
| Format 1D (Frame Configuration #1~#6) | 27 | 29 | 31 | 33 | 34 | 35 |
| Format 0/1A (Frame Configuration #0) | 27 | 29 | 31 | 33 | 34 | 35 |
| Format 1B (Frame Configuration #0) | 27 + 1 | 29 + 1 | 31 + 2 | 33 + 1 | 34 + 1 | 35 + 1 |
| Format 1D (Frame Configuration #0) | 27 + 1 | 29 + 1 | 31 + 2 | 33 + 1 | 34 + 1 | 35 + 1 |
| Format 1 | 22 | 25 | 30 | 34 | 36 | 42 |
| Format 2 (2 tx) | 34 | 37 | 42 | 46 | 48 | 54 |
| Format 2 (4 tx) | 37 | 41 | 45 | 49 | 51 | 57 |
| Format 2A (2 tx) | 31 | 34 | 39 | 43 | 45 | 51 |
| Format 2A (4 tx) | 33 | 36 | 41 | 45 | 47 | 53 |
| Format 2B | 31 | 34 | 39 | 43 | 45 | 51 |
| Format 2C | 33 | 36 | 41 | 45 | 47 | 53 |
| Format 2D | 35 | 38 | 43 | 47 | 49 | 55 |
| Format 4 (Frame Configuration #0, 2tx) | 36 | 37 + 1 | 40 | 42 | 43 | 44 |
| Format 4 (Frame Configuration #0, 4tx) | 39 | 40 | 43 + 1 | 45 + 1 | 46 | 47 |
| Format 4 (Frame Configuration #1~#6, 2tx) | 34 + 1 | 35 | 38 | 40 | 41 | 42 + 1 |
| Format 4 (Frame Configuration #1~#6, 4tx) | 37 + 1 | 38 + 1 | 41 + 1 | 43 | 44 | 45 |

TABLE 4

Bit Number of Conflict Information

{12, 14, 16, 20, 24, 26, 32, 40, 44, 56}

One or more padding bit(s) with zero value shall be appended to the first DCI and the DCI 1A until the above requirement is satisfied. When the first DCI is DCI format 0, and DCI 1B or DCI 1D that is mapped onto the same searching space and used to schedule the second carrier has the same bit number as the first DCI, one or more padding bits with 0 value shall be appended to the DCI 1B or DCI 1D until the bit number of DCI 1B or DCI 1D is different from the bit number for the first DCI, and does not equal to the value as shown in Table 4.

When the first DCI is DCI format 4, and one format of DCI {1, 2, 2A, 2B, 2C, 2D} that is mapped onto the same searching space and used to schedule the second carrier has the same bit number as the first DCI, a padding bit having 0 value should be appended to the first DCI.

Preferably, the uplink reference frame configuration of the second carrier is configured by the SIB of the second carrier.

According to the transmission method used in UE for a TDD-FDD joint system, the method comprises the following steps:

Step A: receiving a second DCI on the first carrier, wherein the first carrier is the FDD downlink carrier, and the second DCI is the downlink-scheduling DCI;

Step B: receiving downlink data on PDSCH in the second carrier according to the scheduling in the second DCI, wherein the second carrier is a TDD carrier;

wherein the corresponding downlink DCI is counted according to the payload size of the cross-carrier scheduling performed in the FDD system for the second carrier. That is the second DCI does not include TDD specific bit.

According to the transmission method used in a system equipment for a TDD-FDD joint system, the method comprises the following steps:

Step A: transmitting a first DCI on the subframe n on a first carrier, wherein the first carrier is a FDD downlink carrier, n is an integer, and the first DCI is the uplink-scheduling DCI; and Step B: receiving the uplink data on PUSCH of a second carrier in the subframe n+k according to the scheduling of the first DCI, wherein the second carrier is a TDD carrier, k is the uplink scheduling delay of the uplink reference frame configuration of the second carrier on the subframe n;

wherein for frame configuration #{0, 1, 2, 3, 4, 5, 6}, the first DCI comprises the ULI/DAI bits only when the uplink reference frame configuration is #0. That is when the uplink reference frame configuration is frame configuration #0, the first DCI includes the ULI/DAI bits; when the uplink reference frame configuration is one of the frame configuration #{1, 2, 3, 4, 5, 6}, the first DCI does not include the ULI/DAI bits.

Preferably, the Step A comprises the following Step A1, and the Step B comprises the following Step B1:

Step A1: in the jth subframe before the subframe n+k of the second carrier, transmitting at least one of the following:
 PDSCH data;
 PDCCH indicating SPS release;
 EPDCCH indicating SPS release;
Step B1: receiving ACK/NACK associating with the Step A1 on the PUSCH;
wherein j is an uplink scheduling delay of the FDD system.

Preferably, the method further comprises the following step:

Step C: the higher layer transferring the ACK information (to the physical layer) associating with the uplink data; and Step D: Transmitting ACK or maintaining zero power in the corresponding PHICH resource in the sth subframe after the subframe n+k on the first carrier;

wherein the s is the PHICH reporting delay corresponding to the uplink reference frame configuration.

Preferably, a padding bit of the first DCI is added according to the LTE scheme, wherein the corresponding downlink DCI is counted according to the payload size of the cross-carrier scheduling performed in the FDD system for the second carrier.

Preferably, the uplink reference frame configuration of the second carrier is configured by the SIB of the second carrier.

According to the transmission method used in a system equipment for a TDD-FDD joint system, the method comprises the following steps:

Step A: transmitting a second DCI on the first carrier, wherein the first carrier is the FDD downlink carrier, and the second DCI is the downlink-scheduling DCI;

Step B: transmitting downlink data on PDSCH in the second carrier according to the scheduling in the second DCI, wherein the second carrier is a TDD carrier;

wherein the corresponding downlink DCI is counted according to the payload size of the cross-carrier scheduling performed in the FDD system for the second carrier.

According to the user equipment in the TDD-FDD combined system, the user equipment comprises:

a first module for receiving a first DCI on the subframe n on a first carrier, wherein the first carrier is a FDD downlink carrier, n is an integer, and the first DCI is the uplink-scheduling DCI; and a second module for transmitting the uplink data on PUSCH of a second carrier in the subframe n+k according to the scheduling of the first DCI, wherein the second carrier is a TDD carrier, k is the uplink scheduling delay of the uplink reference frame configuration of the second carrier on the subframe n;

wherein for frame configuration #{0, 1, 2, 3, 4, 5, 6}, the first DCI comprises the ULI/DAI bits only when the uplink reference frame configuration is configuration #0.

According to the system equipment in the TDD-FDD joint system, the system equipment comprises:

a first module for transmitting a first DCI on the subframe n on a first carrier, wherein the first carrier is a FDD downlink carrier, n is an integer, and the first DCI is the uplink-scheduling DCI; and a second module for receiving the uplink data on PUSCH of a second carrier in the subframe n+k according to the scheduling of the first DCI, wherein the second carrier is a TDD carrier, k is the uplink scheduling delay of the uplink reference frame configuration of the second carrier on the subframe n;

wherein for frame configuration #{0, 1, 2, 3, 4, 5, 6}, the first DCI comprises the ULI/DAI bits only when the uplink reference frame configuration is configuration #0.

The present invention solves the problem of DCI redundancy in the scenario that the FDD carrier is PCC and the TDD carrier is SCC. The PUSCH scheduling complies with the TDD system timing, and the PDSCH scheduling complies with the FDD system timing. When the uplink reference frame configuration of SCC is #1~6, the uplink-scheduling DCI does not include ULI/DAI. It reduces the overhead of DCI redundancy, and increases the DCI coverage. In the meanwhile, the present invention maintains the compatibility with the exiting system at upmost.

BRIEF DESCRIPTION OF THE DRAWINGS

The other features, objectives and advantages of certain exemplary embodiments of the present invention will be more apparent from the following description taken in conjunction with the accompanying drawings, in which.

Figure 1:
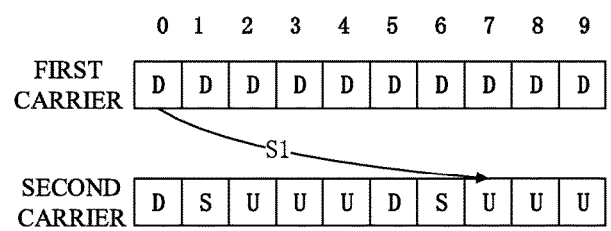
FIG. 1 is a schematic diagram showing HARQ timing of the uplink reference frame structure being as #0 according to one embodiment of the present invention.

In the drawings:
300 is user equipment;
301 is a first module of the user equipment;
302 is a second module of the user equipment;
400 is a system equipment;
401 is a first module of the system equipment; and
402 is a second module of the system equipment.

DETAILED DESCRIPTION

The following specific embodiments are provided to illustrate the present invention in details. The following embodiments will help to those having ordinary skills in the art to further understand the invention, but not limit the present invention in any forms. It should be pointed out that, for those having ordinary skills in the art, the various modification and improvements may be conducted without departing from the spirit of the present invention. All of these belong to the protection scope of the present invention.

Embodiment I

Embodiment I illustrates the HARQ timing when the uplink reference frame configuration is #0, as shown in FIG. 1. In FIG. 1, the first carrier is FDD downlink carrier: PCC, and the second carrier is TDD carrier: SCC. The second carrier is configured as frame configuration #0 through SIB.

For the UE, a first DCI—format #0 is received on the subframe 0 of the first carrier. The first carrier is FDD downlink carrier. The first DCI includes two DIL bit information indicating the scheduled subframe is subframe 7 (as shown by the arrow S1). The uplink data is transmitted on PUSCH according to the scheduling of the first DCI on the subframe 7 of the second carrier. The second carrier is a TDD carrier.

For the base station, a first DCI—format #0 is transmitted on the subframe 0 of the first carrier. The first carrier is FDD downlink carrier. The first DCI includes two DIL bit information indicating the scheduled subframe is subframe 7 (as shown by the arrow S1). The uplink data is received on PUSCH according to the scheduling of the first DCI on the subframe 7 of the second carrier. The second carrier is a TDD carrier.

Embodiment II

Figure 2:
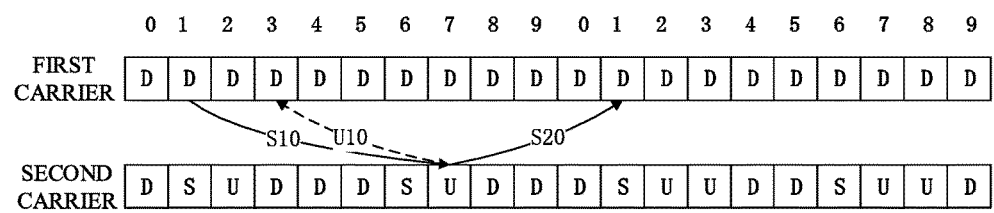
FIG. 2 is a schematic diagram showing HARQ timing of the uplink reference frame structure being as #1 according to one embodiment of the present invention.

Embodiment II illustrates the HARQ timing when the uplink reference frame configuration is #1, as shown in FIG. 2. In FIG. 2, the first carrier is FDD downlink carrier: PCC, and the second carrier is TDD carrier: SCC. The second carrier supports eIMTA: the first frame is frame configuration #2, and the second frame is frame configuration #1. The second carrier is configured as frame configuration #1 through RRC signaling.

For the UE, a first DCI—format #4 is received on the subframe 1 of the first carrier. The first carrier is FDD downlink carrier. The first DCI does not include ULI/DAI bits. The uplink data is transmitted on PUSCH according to the scheduling of the first DCI on the subframe 7 of the first carrier according to the HARQ timing (as shown by the arrow S10) of frame configuration #1. The second carrier is a TDD carrier. The corresponding ACK/NACK is received on the subframe 1 of the second frame of the first carrier according the HARQ timing (as shown by the arrow S20) of frame configuration #1. When the UE receives EPDCCH or PDCCH or PDSCH from the first carrier or the second carrier on the fourth subframe (as shown by the arrow U20) prior to the subframe 7, the UE transmits corresponding uplink ACK/NACK on the subframe 7.

For the base station, a first DCI—format #4 is transmitted on the subframe 1 of the first carrier. The first carrier is FDD downlink carrier. The first DCI does not include ULI/DAI bits. The uplink data is received on PUSCH according to the scheduling of the first DCI on the subframe 7 of the first carrier according to the HARQ timing (as shown by the arrow S10) of frame configuration #1. The second carrier is a TDD carrier. The corresponding ACK/NACK is transmitted on the subframe 1 of the second frame of the first carrier according the HARQ timing (as shown by the arrow S20) of frame configuration #1. When the base station transmits EPDCCH or PDCCH or PDSCH from the first carrier or the second carrier on the fourth subframe (as shown by the arrow U20) prior to the subframe 7, the base station receives corresponding uplink ACK/NACK on the subframe 7.

Embodiment III

Figure 3:
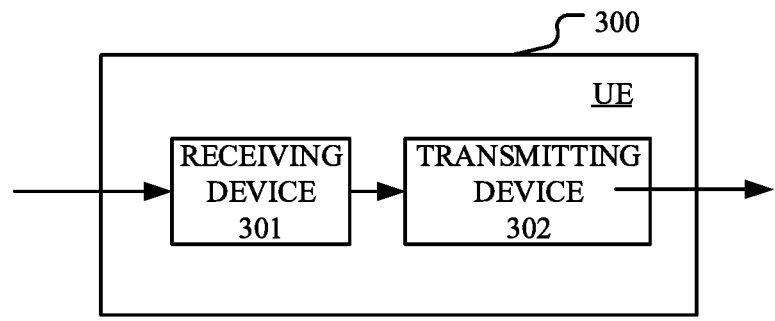
FIG. 3 is a block diagram of a processing device sued in the UE according to one embodiment of the present invention.

Embodiment III is the block diagram of the processing device in the UE, as shown in FIG. 3. In FIG. 3, the UE processing device 300 comprises a receiving device 301 and a transmitting device 302.

The receiving device 301 receives a first DCI on the subframe n on a first carrier. The first carrier is a FDD downlink carrier, n is an integer, and the first DCI is the uplink-scheduling DCI. The transmitting device 302 transmits uplink data on PUSCH of a second carrier in the subframe n+k according to the scheduling of the first DCI. The second carrier is a TDD carrier, k is the uplink scheduling delay of the uplink reference frame configuration of the second carrier on the subframe n.

When the uplink reference frame configuration is frame configuration #0, the first DC includes the ULI/DAI bits. When the uplink reference frame configuration is one of the frame configuration #{1, 2, 3, 4, 5, 6}, the first DCI does not include the ULI/DAI bits.

Embodiment IV

Figure 4:
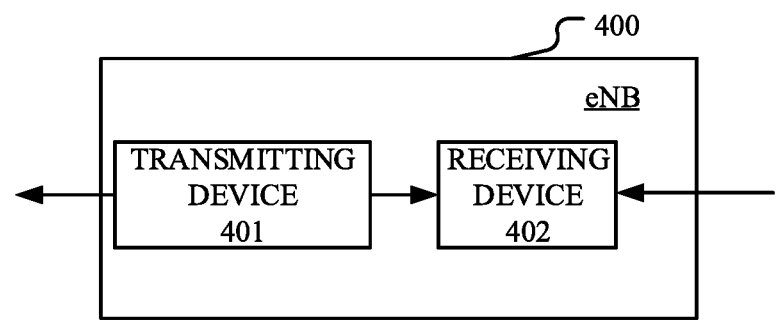
FIG. 4 is a block diagram of a processing device sued in the base station according to one embodiment of the present invention.

Embodiment IV is the block diagram of the processing device in the base station, as shown in FIG. 4. In FIG. 4, the eNB processing device 400 comprises a transmitting device 401 and a receiving device 402.

The transmitting device 401 transmits a first DCI on the subframe n on a first carrier. The first carrier is a FDD downlink carrier, n is an integer, and the first DCI is the uplink-scheduling DCI. The receiving device 402 receives uplink data in the subframe n+k on a second carrier on PUSCH according to the scheduling of the first DCI. The second carrier is a TDD carrier, k is the uplink scheduling delay of the uplink reference frame configuration of the second carrier on the subframe n. When the uplink reference frame configuration is one of the frame configuration #{1, 2, 3, 4, 5, 6}, the first DCI does not include the ULI/DAI bits.

Those having ordinary skills in the art may understand all or part of the steps in the above method can be completed by the program to instruction related hardware. The program can be stored in a computer readable storage medium, such as a read-only memory, a hard disk or an optical disk, etc. Optionally, all or part of the embodiment of the above example can be implemented using one or more integrated circuits. Accordingly, each module unit of the embodiment can be realized in the form of hardware, and can be realized by the software function module, and the application is not limited to the combination of the software and the hardware of any particular form.

The present invention is illustrated and described with reference to specific embodiment. It should be noted that the invention is not limited to the specific implementation mentioned above. Those skilled in the art may make various variation or modifications in the scope of the claims. This does not affect the substance of the present invention.

What is claimed is:

1. A transmission method used in UE for a TDD-FDD joint system, comprising:

Step A: receiving a first DCI on the subframe n on a first carrier, wherein the first carrier is a FDD downlink carrier, n is an integer, and the first DCI is the uplink-scheduling DCI; and Step B: transmitting the uplink data on PUSCH of a second carrier in the subframe n+k according to the scheduling of the first DCI, wherein the second carrier is a TDD carrier, k is the uplink scheduling delay of the uplink reference frame configuration of the second carrier on the subframe n;

wherein for frame configuration #{0, 1, 2, 3, 4, 5, 6}, the first DCI comprises ULI and DAI bits only when the uplink reference frame configuration is configuration #0.

2. The transmission method used in UE for a TDD-FDD joint system according to claim 1, wherein the Step A comprises the following step A1, and the Step B comprises the following Step B1:
Step A1: in the jth subframe before the subframe n+k of the second carrier, receiving at least one of the following:
PDSCH data;
PDCCH indicating SPS release;
EPDCCH indicating SPS release;
Step B1: transmitting ACK/NACK associating with the Step A1 on the PUSCH;
wherein j is an uplink scheduling delay of the FDD system.

3. The transmission method used in UE for a TDD-FDD joint system according to claim 1, wherein the method comprises the following steps:
Step C: for the uplink data, detecting the PHICH information in the sth subframe after the subframe n+k on the first carrier, wherein s is the PHICH reporting delay corresponding to the uplink reference frame configuration;
Step D: transferring ACK information to higher layers when the PHICH is detected as ACK, or when no PHICH is detected.

4. The transmission method used in UE for a TDD-FDD joint system according to claim 1, wherein a padding bit of the first DCI is added according to the LTE scheme, wherein the corresponding downlink DCI is counted according to the payload size of the cross-carrier scheduling performed in the FDD system for the second carrier.

5. The transmission method used in UE for a TDD-FDD joint system according to claim 1, wherein the uplink reference frame configuration of the second carrier is configured by the SIB of the second carrier.

6. A transmission method used in a system equipment for a TDD-FDD joint system, comprising:
Step A: transmitting a first DCI on the subframe n on a first carrier, wherein the first carrier is a FDD downlink carrier, n is an integer, and the first DCI is the uplink-scheduling DCI; and
Step B: receiving the uplink data on PUSCH of a second carrier in the subframe n+k according to the scheduling of the first DCI, wherein the second carrier is a TDD carrier, k is the uplink scheduling delay of the uplink reference frame configuration of the second carrier on the subframe n;
wherein for frame configuration #{0, 1, 2, 3, 4, 5, 6}, the first DCI comprises ULI and DAI bits only when the uplink reference frame configuration is frame configuration #0.

7. The transmission method used in a system equipment for a TDD-FDD joint system according to claim 6, wherein the Step A comprises the following Step A1, and the Step B comprises the following Step B1:
Step A1: in the jth subframe before the subframe n+k of the second carrier, transmitting at least one of the following:
PDSCH data;
PDCCH indicating SPS release;
EPDCCH indicating SPS release;
Step B1: receiving ACK/NACK associating with the Step A1 on the PUSCH;
wherein j is an uplink scheduling delay of the FDD system.

8. The transmission method used in a system equipment for a TDD-FDD joint system according to claim 6, wherein the method comprises the following steps:
Step C: the higher layer transferring the ACK information associating with the uplink data; and
Step D: Transmitting ACK or maintaining zero power in the corresponding PHICH resource in the sth subframe after the subframe n+k on the first carrier;
wherein the s is the PHICH reporting delay corresponding to the uplink reference frame configuration.

9. The transmission method used in a system equipment for a TDD-FDD joint system according to claim 6, a padding bit of the first DCI is added according to the LTE scheme, wherein the corresponding downlink DCI is counted according to the payload size of the cross-carrier scheduling performed in the FDD system for the second carrier.

10. The transmission method used in a system equipment for TDD-FDD joint system according to claim 6, wherein the uplink reference frame configuration of the second carrier is configured by the SIB of the second carrier.

11. A user equipment in the TDD-FDD joint system, comprising:
a first module for receiving a first DCI on the subframe n on a first carrier, wherein the first carrier is a FDD downlink carrier, n is an integer, and the first DCI is the uplink-scheduling DCI; and
a second module for transmitting the uplink data on PUSCH of a second carrier in the subframe n+k according to the scheduling of the first DCI, wherein the second carrier is a TDD carrier, k is the uplink scheduling delay of the uplink reference frame configuration of the second carrier on the subframe n;
wherein for frame configuration #{0, 1, 2, 3, 4, 5, 6}, the first DCI comprises ULI and DAI bits only when the uplink reference frame configuration is configuration #0.

12. A system equipment in the TDD-FDD joint system, comprising:
a first module for transmitting a first DCI on the subframe n on a first carrier, wherein the first carrier is a FDD downlink carrier, n is an integer, and the first DCI is the uplink-scheduling DCI; and
a second module for receiving the uplink data on PUSCH of a second carrier in the subframe n+k according to the scheduling of the first DCI, wherein the second carrier is a TDD carrier, k is the uplink scheduling delay of the uplink reference frame configuration of the second carrier on the subframe n;
wherein for frame configuration #{0, 1, 2, 3, 4, 5, 6}, the first DCI comprises ULI and DAI bits only when the uplink reference frame configuration is configuration #0.

* * * * *